United States Patent
Seshiah

(10) Patent No.: US 11,249,801 B2
(45) Date of Patent: Feb. 15, 2022

(54) FLEXIBLE COMPUTING JOB SCHEDULING SYSTEMS AND METHODS

(71) Applicant: Mastercard International Incorporated, Purchase, NY (US)

(72) Inventor: Gokulakrishnan Seshiah, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 138 days.

(21) Appl. No.: 16/845,884

(22) Filed: Apr. 10, 2020

(65) Prior Publication Data
US 2020/0326979 A1    Oct. 15, 2020

Related U.S. Application Data

(60) Provisional application No. 62/832,372, filed on Apr. 11, 2019.

(51) Int. Cl.
*G09F 9/46*    (2006.01)
*G06F 9/48*    (2006.01)

(52) U.S. Cl.
CPC .................. *G06F 9/4881* (2013.01)

(58) Field of Classification Search
None
See application file for complete search history.

(56) References Cited

U.S. PATENT DOCUMENTS

| | | | |
|---|---|---|---|
| 5,721,686 A | 2/1998 | Shahraray et al. | |
| 7,236,976 B2 | 6/2007 | Breitenbach et al. | |
| 7,669,081 B2 | 2/2010 | Lett et al. | |
| 8,020,161 B2 | 9/2011 | Markov | |
| 8,453,152 B2 * | 5/2013 | Druyan | G06F 9/4881 718/103 |
| 8,631,412 B2 | 1/2014 | Longobardi et al. | |

(Continued)

OTHER PUBLICATIONS

Frachtenberg et al. "Adaptive Parallel Job Scheduling with Flexible Coscheduling", 2005 IEEE, pp. 1066-1077.*

(Continued)

*Primary Examiner* — Van H Nguyen
(74) *Attorney, Agent, or Firm* — Armstrong Teasdale LLP

(57) ABSTRACT

A job scheduling system includes a primary job scheduler and a secondary scheduling gatekeeper. The primary job scheduler provides primary scheduling primitives. The primary job scheduler is configured to activate a first job on an activation date determined based on a primary scheduling definition of the first job, and execute a secondary scheduling gatekeeper to evaluate whether a target program associated with the first job is executed during the activation. The gatekeeper provides enhanced scheduling primitives that include scheduling primitives not in the primary scheduling primitives. The gatekeeper is configured to evaluate a secondary scheduling definition of the first job to determine whether the first job should continue to execution and return the enhanced scheduling result to the primary job scheduler. The secondary scheduling definition is configured using the set of enhanced scheduling primitives. The system causes the execution of the target program based on the result.

17 Claims, 6 Drawing Sheets

(56) References Cited

U.S. PATENT DOCUMENTS

| | | | | |
|---|---|---|---|---|
| 8,887,165 B2 * | 11/2014 | Suzuki | ................ | G06F 9/4887 |
| | | | | 718/103 |
| 9,128,777 B2 * | 9/2015 | DeRosa | ................ | G06F 9/485 |
| 9,176,774 B2 * | 11/2015 | Druyan | ................ | G06F 9/4881 |
| 10,394,597 B1 * | 8/2019 | Kowalski | .............. | G06F 9/4887 |

OTHER PUBLICATIONS

Aloulou "On the reactive scheduling design using flexible predictive schedules", 2002 IEEE, 6 pages.*

* cited by examiner

FLEXIBLE COMPUTING JOB SCHEDULING SYSTEMS AND METHODS

CROSS REFERENCE TO RELATED APPLICATIONS

This application claims priority to U.S. Provisional Patent Application No. 62/832,372, filed Apr. 11, 2019, entitled "FLEXIBLE COMPUTING JOB SCHEDULING SYSTEMS AND METHODS," the entire contents and disclosure of which are hereby incorporated by reference herein in their entirety.

FIELD OF THE DISCLOSURE

The field of the disclosure relates generally to job scheduling for a computing system and, more specifically, to systems and methods for flexible job scheduling within a computing system using a secondary scheduling gatekeeper.

BACKGROUND

In enterprise computing environments, computing departments typically have programs (e.g., batch processes) that need to be executed on a regular basis. For example, a payment processing network may execute a batch process for transmitting transaction data summary files to or from an issuer on a daily basis. Automation of such batch processes is typically performed by a conventional job scheduler, which can be configured to execute a target program at a particular date, time, or at a particular frequency. For example, an administrator may configure a job definition for this file transfer process. The job definition may define, for example, a location of an executable program (the target program), a server on which to execute that target program, and a schedule defining when to run that target program (e.g., daily at midnight, weekly on Thursdays at nine p.m., and so forth).

Conventional job schedulers provide a set of native scheduling primitives with which administrators use to configure job schedules. Example scheduling primitives may include, for example, calendar frequency primitives (e.g., daily, weekly, monthly), date primitives (e.g., June 1), and time primitives (e.g., 0900, 11:00 am-2:00 pm). However, some batch processes may require schedule timing that may not be possible with a particular job scheduler's native scheduling primitives.

Accordingly, a scheduling gatekeeper is needed that can supplement the native scheduling primitives of a conventional job scheduler and allow more refined job scheduling.

BRIEF DESCRIPTION

In one aspect, a job scheduling system for providing enhanced job scheduling with a primary job scheduler is provided. The job scheduling system includes a primary job scheduler and a secondary scheduling gatekeeper. The primary job scheduler provides a set of primary scheduling primitives. The set of primary scheduling primitives are usable to configure when jobs activate within the primary job scheduler. The primary job scheduler is configured to activate a first job on an activation date determined based on a primary scheduling definition of the first job. The primary scheduling definition is configured using the set of primary scheduling primitives. The primary job scheduler is also configured to execute the secondary scheduling gatekeeper to evaluate whether a target program associated with the first job is executed during the activation. The secondary scheduling gatekeeper provides a set of enhanced scheduling primitives. The set of enhanced scheduling primitives include one or more scheduling primitives different from the set of primary scheduling primitives. The secondary scheduling gatekeeper is configured to evaluate a secondary scheduling definition of the first job to determine whether the first job should continue to execution. The secondary scheduling definition is configured using one or more of the scheduling primitives of the set of enhanced scheduling primitives. The secondary scheduling gatekeeper is also configured to return the enhanced scheduling result to the primary job scheduler. The primary job scheduler further configured to cause the execution of the target program based on the enhanced scheduling result.

In another aspect, a computer-implemented method for job scheduling and execution is provided. The method is implemented using a processor in communication with a memory. The method includes activating, by a primary job scheduler, a first job on an activation date determined based on a primary scheduling definition of the first job. The primary scheduling definition is configured using a set of primary scheduling primitives provided by the primary job scheduler. The method also includes executing, by the primary job scheduler, a secondary scheduling gatekeeper to evaluate whether a target program associated with the first job is executed during the activation. The method further includes evaluating, by a secondary scheduling gatekeeper, a secondary scheduling definition of the first job to determine whether the first job should continue to execution. The secondary scheduling definition is configured using one or more of scheduling primitives of a set of enhanced scheduling primitives provided by the secondary scheduling gatekeeper. The set of enhanced scheduling primitives includes one or more scheduling primitives not includes in the set of primary scheduling primitives. The method also includes causing the execution of the target program based on the enhanced scheduling result.

In yet another aspect, a non-transitory computer readable medium that includes computer executable instructions is provided. When executed by a computing device comprising at least one processor in communication with at least one memory device, the computer executable instructions cause the computing device to activate, by a primary job scheduler, a first job on an activation date determined based on a primary scheduling definition of the first job. The primary scheduling definition is configured using a set of primary scheduling primitives provided by the primary job scheduler. The instructions also cause the computing device to execute, by the primary job scheduler, a secondary scheduling gatekeeper to evaluate whether a target program associated with the first job is executed during the activation. The instructions further cause the computing device to evaluate, by a secondary scheduling gatekeeper, a secondary scheduling definition of the first job to determine whether the first job should continue to execution. The secondary scheduling definition is configured using one or more of scheduling primitives of a set of enhanced scheduling primitives provided by the secondary scheduling gatekeeper. The set of enhanced scheduling primitives includes one or more scheduling primitives not includes in the set of primary scheduling primitives. The instructions also cause the computing device to cause the execution of the target program based on the enhanced scheduling result.

BRIEF DESCRIPTION OF THE DRAWINGS

FIGS. 1-5 show example embodiments of the systems and methods described herein.

FIG. 1 is a diagram of a networked environment in which a job scheduling server executes a secondary scheduling gatekeeper in conjunction with a primary job scheduler to control the scheduled execution of target programs on one or more execution servers.

FIG. 2 is a diagram of an example method for providing enhanced job scheduling functionality to a primary job scheduler using the networked environment in FIG. 1.

FIG. 3 illustrates an example configuration of a user computing device in accordance with one embodiment of the present disclosure.

FIG. 4 illustrates an example configuration of a server computing device, in accordance with an embodiment of the present disclosure.

DETAILED DESCRIPTION

Figure 1:
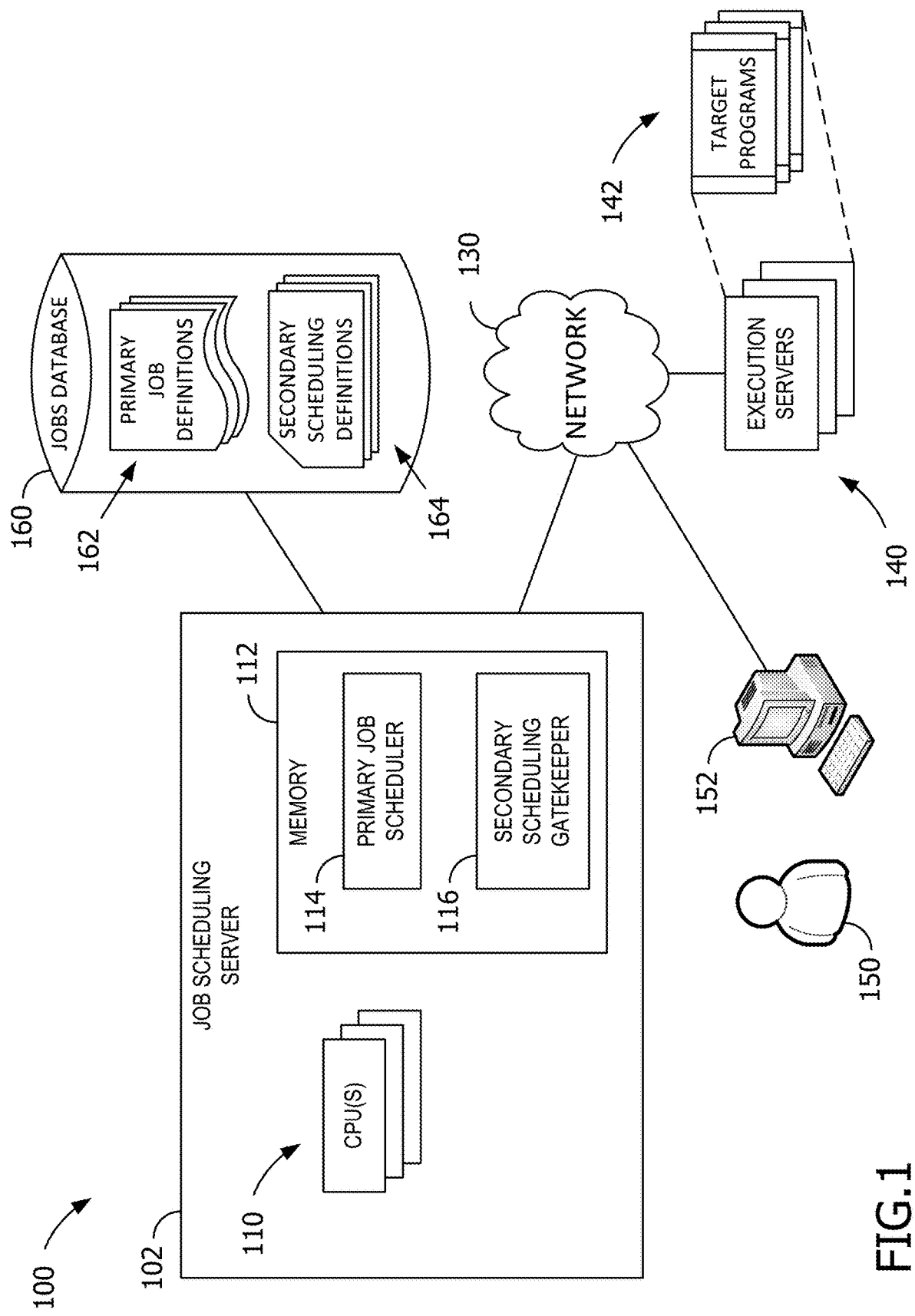

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, methods and systems for providing flexible job scheduling within a computing system.

A conventional job scheduler includes a set of scheduling primitives provided for use defining when a job will be executed by the job scheduler. The phrase "conventional scheduling primitives," as used herein, refers to the set of scheduling primitives used by the conventional job scheduler. These conventional scheduling primitives, in certain circumstances, may prove inadequate for configuring job schedules for particular target programs. However, migration to another job scheduler with greater scheduling primitives or particular scheduling primitives may not be feasible due to, for example, the manpower required to migrate hundreds or thousands of existing job definitions from one scheduling platform to another.

The present disclosure provides a secondary scheduling gatekeeper and associated systems and methods that allow continued use of an existing job scheduler (referred to herein as the "primary job scheduler") but that provides enhanced scheduling capabilities that overcome the limitations of the conventional scheduling primitives of the primary job scheduler. In an example embodiment, an administrator defines a job definition for a subject job (also referred to herein as a "primary job" and "primary job definition") within the primary job scheduler. The primary job definition defines a target program (e.g., the program that is desired to be executed, and which is the subject of this primary job definition). The primary job definition also defines a primary job schedule using the conventional scheduling primitives of the primary job scheduler. However, for this example primary job, the conventional scheduling primitives cannot be used to accurately define when this target program needs to execute.

For example, presume an administrator wishes to configure the target program to execute on the second Monday of each month, but the conventional scheduling primitives provide only a "weekly" with "day of week" primitive (e.g., "every Monday") and a "monthly" with "day of month" primitive (e.g., "on the $6^{th}$ of every month"). With these conventional scheduling primitives, the administrator is not able to schedule the target program to execute on the second Monday of every month because the weekly primitive will cause the target program to execute on every Monday and the monthly primitive cannot target the second Monday of each month because the day of month for the second Monday is not consistent across the months and years.

The secondary scheduling gatekeeper, in the example embodiment, provides a second layer of scheduling that is used to overcome the limitations of the conventional scheduling primitives. More specifically, and for example, the administrator may configure the primary job to use the secondary scheduling gatekeeper for additional scheduling options. To affect a schedule that executes the target program on the second Monday of each month, the administrator configures the primary job to trigger in the primary job scheduler on every Monday (e.g., using the "weekly" with "day of week" conventional scheduling primitive provided by the primary job scheduler). This will cause the primary job to trigger every Monday. It should be noted that the primary job schedule is too frequent (e.g., "all Mondays of each month"), but does include the particular Mondays that are desired (e.g., "the second Monday of each month").

In addition, the administrator configures a secondary schedule definition for the primary job. The secondary schedule definition is configured with an enhanced set of scheduling primitives ("enhanced scheduling primitives") provided by the secondary scheduling gatekeeper. For example, presume that the enhanced scheduling primitives include a "particular week within month" primitive (e.g., "first Friday of each month," "last Saturday of each month", and so forth). The administrator configures the secondary schedule definition for the primary job to be "second Monday of each month" (e.g., using the "particular week within month" primitive of the enhanced scheduling primitives).

During operation, the secondary scheduling gatekeeper is activated by the primary job scheduler when the primary job scheduler triggers the primary job. The secondary scheduling gatekeeper acts as a secondary arbitrator controlling whether or not the underlying target program is executed during this run of the primary job. More specifically, when the primary job scheduler activates the secondary scheduling gatekeeper (e.g., when triggering the primary job), the secondary scheduling gatekeeper loads and processes the secondary schedule definition for the primary job. The secondary schedule definition and the particular enhanced primitives are compared to the present date (and optionally, time) to determine whether or not the present date satisfies the secondary scheduling definition. The secondary scheduling gatekeeper returns a positive result (e.g., a return value of TRUE) when the present date satisfies the secondary scheduling definition (e.g., if today is the second Monday of the month) and a negative result (e.g., a return value of FALSE) when the present date and time does not satisfy the secondary scheduling definition (e.g., if today is the first, third, fourth, etc., Monday of the month).

If the return value from the secondary scheduling gatekeeper is FALSE, then the primary job scheduler terminates the processing of the primary job at this point, thereby not executing the target program on the excluded Mondays. If the return value is TRUE, then the primary job scheduler continues processing of the primary job, thereby causing the target program to be executed on the second Monday. Accordingly, the secondary scheduling gatekeeper is appended as an additional scheduling controller, excluding execution of the target program during some runs of the primary job while allowing execution of the target program on just the runs of the primary job that satisfy the enhanced scheduling criteria.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a diagram of a networked environment 100 in which a job scheduling server 102 executes a secondary scheduling gatekeeper (or just "gatekeeper") 116 in conjunction with a primary job scheduler 114 to control the scheduled execution of target programs 142 on one or more execution servers 140. In the example embodiment, the job scheduling server 110 is a computing device that includes at least one or more central processing units ("CPUs") 110 and a memory 112. The memory 112 stores the primary job scheduler 114 and the gatekeeper 116. Memory 112 may represent volatile memory (e.g., random access memory (RAM), cache memory) or non-volatile secondary storage (e.g., disk storage). During operation, one or more of the CPUs 110 execute both the primary job scheduler 114 and the gatekeeper 116. The job scheduling server 102 may include other conventional computer components not shown here for purposes of clarity (e.g., network interface card(s), local secondary storage, storage network adapters, and so forth).

In the example embodiment, the job scheduling server is network-connected to the execution servers 140 through a network. The network 130 may be, for example, a local-area network (LAN), wide-area network (WAN), and may include connectivity to one or more wireless networks or to the Internet (not separately depicted). In the example embodiment, the network 130 is an enterprise network of a business, and the execution servers 140 represent infrastructure computing devices used to manage business operations of a business entity. In some embodiments, the business entity is a payment processing network and the business operations include various functionality and accounting operations associated with processing payment card transactions and associated business activities.

The execution servers 140, in the example embodiment, represent the servers upon which the primary job scheduler 114 may execute jobs. Some jobs may be executed locally on the job scheduling server 102. Other jobs may be configured for remote execution (e.g., on one or more execution servers 140). Target programs 142 are the executable program(s) that are identified for execution by the jobs in the primary job scheduler 114. In other words, scheduling and execution of the target programs is the primary focus and function of the primary job scheduler 114. In some embodiments, the target programs 142 may be executables locally stored on particular execution servers 140. In other embodiments, the target programs 142 may be executables that are transmitted to the execution server 140 at the time of execution. In still other embodiments, the target programs 142 may be already-running executables (e.g., services) with which a job may target for a job execution (e.g., via an API, script, or other programmatic interface).

In the example embodiment, the primary job scheduler is communicatively connected to a jobs database 160 which stores both primary job definitions 162 and secondary scheduling definitions 164. The jobs database 160 may represent, for example, configuration files of the primary job scheduler storing details of the primary job definitions 162 and the secondary scheduling definitions 164. In some embodiments, the jobs database 160 may represent a relational database management system (RDBMS) (not separately shown) configured to store and provide the primary job definitions 162 and the secondary scheduling definitions 164. In some embodiments, the jobs database 160 may be local to the job scheduling server 102. In other embodiments, the jobs database 160 may be network-connected to the job scheduling server 102 (e.g., via network 130, via a storage area network (SAN) (not shown)).

Primary job definitions 162, in the example embodiment, represent the configuration settings and parameters associated with individual jobs or sets of jobs configured for scheduling within the primary job scheduler 114. The term "job," as used herein, refers to a logical construct configured within the primary job scheduler. Jobs are typically configured by an administrator 150 via a personal computing device 152 and a graphical user interface (GUI) (such as GUI 500 shown in FIG. 5A and FIG. 5B) provided by the primary job scheduler 114. Each configured job has an associated primary job definition 162, which stores the parameters, settings, and other configuration elements of the job. Primary job definitions may include, for example, identification of a target program 142 to be executed, identification of a particular execution server 140 on which to execute the target program 142, one or more operational parameters to pass to the target program 142 at execution time, and other conventional job scheduling configuration components.

In addition, in the example embodiment, the primary job definitions 162 also include a schedule for the job that defines when the job will activate within the primary job scheduler 114. The phrase "job activation," as used herein, refers to an instance when a configured job is triggered for processing by the job scheduler 114. Job activation is controlled by the primary schedule for the job (e.g., as defined in the primary job definition 162 for that job). Conventionally, the activation of a job within the primary job scheduler typically leads to one or more executions of the associated target program 142. However, as described herein, the gatekeeper 116 may restrict or otherwise control some executions of the target program even though the job activated within the primary job scheduler 114. Accordingly, in the example embodiment, activation of a job in the primary job scheduler 114 does not necessarily result in an execution of the target program 142.

The primary schedule for a job, in the example embodiment, is defined in the primary job definition 162 for that job. More specifically, the primary job scheduler 114 provides a suite of scheduling primitives which the administrator 150 uses to configure when that job activates. The suite of scheduling primitives provided by the primary job scheduler is referred to herein as the "primary scheduling primitives." Such primary scheduling primitives can include, for example, a "time of day" primitive (e.g., 3:30 am, 0330, minute, hour), a "day of week" primitive (e.g., "on Monday(s)"), a "day of month" primitive (e.g., "the 5$^{th}$ of every month"), a "month" primitive (e.g., "4$^{th}$ month (April)"), and so forth. The administrator 150 uses these primary scheduling primitives to configure jobs within the primary job scheduler. For some jobs, these primary scheduling primitives may be adequate enough to define when the associated target program 142 will run. For example, for a batch processing job that needs to run nightly on each weeknight, the administrator 150 may use the primary scheduling primitives to configure that job to run on every night at 8:00 pm (e.g., using the "time of day" primitive), every Monday through Friday (e.g., using the "day of week" primitive). Accordingly, with this example primary schedule, the primary job scheduler 114 both activates the job every weeknight at 8:00 pm and subsequently executes the target program 142 on the execution server 140.

However, as mentioned above, the set of primary scheduling primitives may be inadequate or otherwise insufficient for defining certain types of job schedules. For example, presume the administrator 150 wishes to have a month-end processing job run on the last Saturday of each month. The above-described set of primary scheduling primitives do not allow for such a schedule.

Accordingly, in the example embodiment, the secondary scheduling gatekeeper 116 is used to supplement the scheduling operations of the primary job scheduler 116. The secondary scheduling gatekeeper 116 defines a suite of enhanced scheduling primitives that can be used to provide a more refined and flexible schedule with the jobs for which the primary scheduling primitives proved insufficient. For example, the enhanced scheduling primitives may include a "last <particular day of week> in month" primitive which can distinguish when the "last Saturday of the month" is in each particular month. If the primary scheduling primitives included such a primitive, then the primary job schedule could be built to accommodate this example job. However, in this example, the primary scheduling primitives are insufficient and the enhanced scheduling primitives of the gatekeeper 116 are used.

In the example embodiment, the primary job scheduler 114 uses the primary job definition for a job to determine when that job is going to activate and be processed by the primary job scheduler. If the primary scheduling primitives are sufficient for the job, then the job may be configured to not invoke the gatekeeper 116 for this job. Accordingly, the primary schedule for that job determines when the target program 142 executes.

If, on the other hand, the primary scheduling primitives are insufficient, then the job may be configured to use the gatekeeper 116 to further refine the execution scheduling of the target program 142. More specifically, and continuing this example, the administrator 150 configures a secondary scheduling definition 164 for the job using the enhanced scheduling primitive. The secondary scheduling definition 164 is configured as the "last Saturday of the month" using the "last <particular day of week> in month" primitive of the enhanced scheduling primitives. The administrator 150 also configures a primary job definition for that job to activate the job on "every Saturday" (e.g., using the "day of week" primitive from the primary scheduling primitives).

During operation, the primary job scheduler 114 uses the primary job definition 162 of the example job to determine when the job activates. In this example, the primary job schedule 162 causes the example job to activate on every Saturday. Since this job is configured to use the enhanced scheduling functionality of the gatekeeper 116, the primary job scheduler 114 invokes the gatekeeper 116 during every activation (e.g., every Saturday).

The secondary scheduling gatekeeper 116, in the example embodiment, determines whether or not the current activation time satisfies the secondary scheduling definition for the current job. More specifically, when invoked by the primary job scheduler 114, the gatekeeper 116 retrieves the secondary scheduling definition for the job and compares the current activation time to the secondary schedule. If the current activation time satisfies the enhanced schedule (e.g., if today is the last Saturday of the current month), then the gatekeeper 116 returns a positive result to the primary job scheduler 114 (e.g., a logical return value of TRUE, or such), indicating that the current activation time satisfies the enhanced schedule, and that execution of the target program 142 is warranted. If the current activation time does not satisfy the enhanced schedule (e.g., if today is not the last Saturday of the current month), then the gatekeeper 116 returns a negative result to the primary job scheduler 114 (e.g., a logical return value of FALSE, or such), indicating that the current activation time does not satisfy the enhanced schedule, and that execution of the target program 142 is not warranted.

The primary job scheduler 114 is configured to continue processing the job and executing the target program 142 on the execution server 140 if the gatekeeper 116 affirms the current time. Otherwise, the primary job scheduler 114 terminates the present activation of the job without executing the target program 142. As such, the example job activates in the primary job scheduler 114 on every Saturday (e.g., due to the primary job definition 162). The gatekeeper 116 evaluates the enhanced schedule on every Saturday, but returns a FALSE value on every Saturday except the last Saturday of the month, when a TRUE value is returned. Accordingly, the primary job scheduler 114 executes the target program 142 on the last Saturday of the month, but terminates the activation of the job on every other Saturday without executing the target program 142.

In this manner, the secondary scheduling gatekeeper 116 provides enhanced scheduling functionality from a suite of enhanced scheduling primitives without having to alter the scheduling primitives of the primary job scheduler (e.g., not typically possible for users of commercial job schedulers) and without having to abandon the primary job scheduler for another job scheduler that has more enhanced scheduling functionality. Further, these systems and methods allow existing jobs and job definitions for which the primary scheduling primitives are sufficient to remain unchanged. To achieve enhanced scheduling, administrators 150 activate the gatekeeper 116 for particular jobs and build secondary scheduling definitions 164 for those jobs using the enhanced scheduling primitives. As such, the gatekeeper 116 provides ease of integration with an existing job scheduler and jobs.

Figure 2:
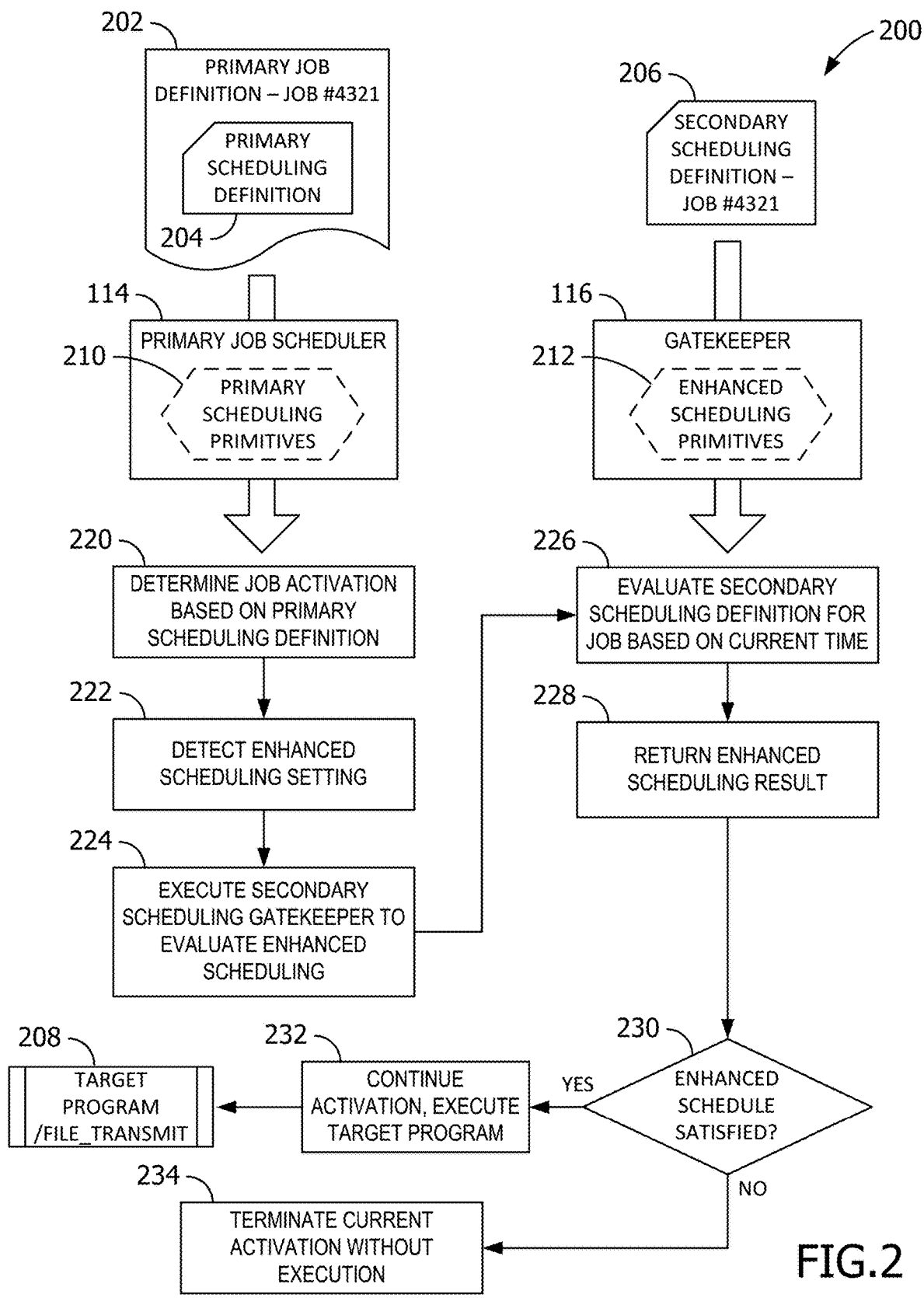

FIG. 2 is a diagram of an example method 200 for providing enhanced job scheduling functionality to a primary job scheduler 114 using the networked environment 100 in FIG. 1. In the example embodiment, the method 200 is a computer-implemented method executed on a computing device such as the job scheduling server 102 shown in FIG. 1. More specifically, the primary job scheduler 114 provides a set of primary scheduling primitives 210 such as those mentioned above with respect to FIG. 1. During operation, the primary job scheduler 114 manages numerous jobs configured by administrators 150 or other programmers or such personnel (e.g., as defined by primary job definitions 162). This management typically includes functions such as managing when to activate the jobs (e.g., as defined in the primary scheduling definitions), managing execution of the target programs 142 (e.g., local execution or remote execution), monitoring status of the target programs 142, performing error control upon failure of target programs 142, displaying execution status and results data to users (e.g., via a graphical user interface), and so forth.

In one example, the administrator 150 may wish to create a new job for a month-end processing task that involves transmitting transaction summary files from the execution server 140 to another device (not shown). This example task is represented here as the target program 208 "/FILE_TRANSMIT", an executable program, script, or such stored on the execution server 140, which may be similar to the target programs 142 shown in FIG. 1. Further, the administrator 150 wants this job to execute on each of the last four days of every month.

Accordingly, in the example embodiment, the administrator 150 configures a primary job definition 202 for "Job #4321" for this task within the primary job scheduler 114. The primary job definition 202 may be similar to the primary job definitions 162 shown in FIG. 1. However, the administrator 150 is constrained by the primary scheduling primitives 210 provided by the primary job scheduler 114 (e.g., as described above). For example, the primary scheduling primitives 210 may not provide a "last day of month" primitive.

As such, the administrator 150 configures this job to enable enhanced scheduling (e.g., as a setting within the primary job definition 202). Further, to specifically target the intended execution days (e.g., the last four days of each month), the administrator 150 configures a secondary scheduling definition 206 for Job #4321 using a set of enhanced scheduling primitives 212 provided by the gatekeeper. The secondary scheduling definition 206 may be similar to the secondary scheduling definitions 164 shown in FIG. 1. In this example, the enhanced scheduling primitives 212 provides a frequency primitive that supports "monthly" as well as a "last day of month" primitive (e.g., which is satisfied on the $31^{st}$ day in calendar months with 31 days, on the $30^{th}$ day in calendar months with 30 days, and so forth). In addition, the enhanced scheduling primitives 212 also provide date range and range modifier primitives that allow for defining date ranges around activation days (e.g., as defined by other primitives).

For example, the secondary scheduling definition 206 for Job #4321 may be defined as:
SCH_1_FREQUENCY: M
SCH_1_START_RANGE: LD
SCH_1_START_RANGE_DAY_MOD: −3
SCH_1_END_RANGE: LD
SCH_1_END_RANGE_DAY_MOD: 0

In this example configuration, SCH_1_FREQUENCY of "M" represents a "monthly" schedule (e.g., every month), and the following four definitions define a date range within the month. More specifically, a start date for the date range is provided by the SCH_1_START_RANGE of "LD", representing a "last day of the month" date, but the inclusion of the SCH_1_START_RANGE_DAY_MOD of "−3" subtracts three from whatever that last day of the month would be. For example, in January (a month with 31 days), the start date for this range would be the $28^{th}$ of January (e.g., 31 minus 3). An end date for the date range is provided by the SCH_1_END_RANGE of "LD", representing the "last day of the month" date (e.g., the $31^{st}$ of January), and a SCH_1_END_RANGE_DAY_MOD of "0" modifies that end date by zero days. Accordingly, the last date for this range would be the $31^{st}$ of January (e.g., 31 minus 0). Accordingly, the example, secondary scheduling definition 206 results in a range of January $28^{th}$ to January $31^{st}$ (for January). Similarly, for February, the same secondary scheduling definition 206 results in a range of February 25th to February 28th (on non-leap years; 26th to 29th on leap years), and so forth.

Accordingly, the above example secondary scheduling definition 206 targets the last four days of each month. However, in the example embodiment, the secondary scheduling definition 206 does not control when the job activates in the primary job scheduler 114. Rather, the primary scheduling definition 204 from the primary job definition 202 defines when job #4321 activates and processes. As such, the administrator 150 configures the primary scheduling definition 204 using the primary scheduling primitives 210 to make sure that job #4321 activates at least on the last four days of the month, but likely others as well. Using the example primary scheduling primitives described above, the administrator 150 is quite restricted. Accordingly, the administrator 150 configures job #4321 to activate every day.

During operation, the primary job scheduler 114 uses the primary scheduling definition 204 of a job (e.g., job #4321) to determine 220 that the job is ready for activation. In this example, since job #4321 is configured to execute every day, the primary job scheduler 114 activates job #4321 every day (e.g., at or after a particular configured time). The primary job scheduler 114 detects 222 that job #4321 is configured for enhanced scheduling and, as such, executes 224 the secondary scheduling gatekeeper 116 to evaluate whether this activation of job #4321 satisfies the secondary scheduling definition 206.

The gatekeeper 116, in the example embodiment, evaluates 226 the secondary scheduling definition 206 for the job, evaluating the current date (e.g., system datetime of the job scheduling server 102, activation datetime of job #4321, or such) as the "evaluation date" against which the secondary scheduling definition 206 is evaluated. In other embodiments, the evaluation date is provided to the gatekeeper 116 during the execution 224 (e.g., as a parameter passed to the gatekeeper 116). In other words, the gatekeeper 116 determines whether the evaluation date satisfies the secondary scheduling definition 206, which is defined in terms of the enhanced scheduling primitives 212. The result generated by the evaluation 226 includes one of at least two logical results: TRUE (e.g., the evaluation date satisfies the secondary scheduling definition 206) or FALSE (e.g., the evaluation date does not satisfy the secondary scheduling definition 206). The gatekeeper 116 returns 228 the results of the enhanced scheduling evaluation to the primary job scheduler 114.

In the example embodiment, if the result of the enhanced schedule evaluation 226 performed by the gatekeeper 116 is an affirmation that the secondary scheduling definition 206 is satisfied (e.g., TRUE, YES, or other such positive) at test 230, then the primary job scheduler 114 continues processing this activation instance of job #4321, which may lead to the execution of the target program 208 on the configured execution server 140. If, at test 230, the result of the enhanced schedule evaluation 226 is not satisfied (e.g., FALSE, NO, or such other negative result), then the primary job scheduler 114 terminates the current activation instance of job #4321 (e.g., without executing the target program 208), thereby completing the method 200.

The gatekeeper 116, as mentioned above, evaluates 226 secondary scheduling definitions 164 using the set of enhanced scheduling primitives 212. In the example embodiment, the set of enhanced scheduling primitives 212 include at least some scheduling primitives that are different from (e.g., not included in) the primary scheduling primitives 210. As such, the collaboration between the primary job scheduler 114 and the gatekeeper 116 allows the primary job scheduler 114 to facilitate scheduling flexibility and options not possible with the native primary scheduling primitives 210. Described below are example enhanced scheduling primitives 212 and associated examples, each of which may not be provided by the primary scheduling primitives 210 (presumed as such in the examples given).

In the example embodiment, the gatekeeper 116 and enhanced scheduling primitives 212, as well as the examples provided below, define weeks as starting on Sunday and ending on Saturday, months beginning on day 1 and ending on the last day of each specific month (e.g., day 28, 29, 30, or 31), quarters are defined as covering the ranges: January 1 through March 31 ("1st quarter"), April 1 through June 30 ("2nd quarter"), July 1 through September 30 ("3rd quarter"), and October 1 through December 31 ("4th quarter"). However, it should be understood that other demarcations of weeks and quarters are possible.

In the example embodiment, the enhanced scheduling primitives 212 provide a frequency ("*_FREQUENCY") primitive, which can be any one of the scheduling frequencies weekly ("W"), monthly ("M"), or quarterly ("Q"), or other such unique frequency identifiers. The frequency primitives define an associated frequency period. By default, the frequency period starts on the first day of the frequency (e.g., on the Sunday of any given week (e.g., for weekly), on the first day of any given month (e.g., for monthly), or on the first day of any given quarter (e.g., for quarterly, 1st of January, April, July, or October).

The enhanced scheduling primitives 212, in the example embodiment, also provide range primitives which can be used in conjunction with the frequency primitive to identify a range of particular days within the frequency period. More specifically, a start range ("*_START_RANGE") defines when, within the frequency period, the range begins. The *_START_RANGE primitive can include any one of the following values:

FD: First day of the frequency period
FWKD: First weekday of frequency period
FWKED: First weekend day of frequency period
FSUN: First Sunday of frequency period
FMON: First Monday of frequency period
FTUES: First Tuesday of frequency period
FWEDNES: First Wednesday of frequency period
FTHURS: First Thursday of frequency period
FFRI: First Friday of frequency period
FSAT: First Saturday of frequency period
LD: Last day of frequency period
LWKD: Last weekday of frequency period
LWKED: Last weekend day of frequency period
LSUN: Last Sunday of frequency period
LMON: Last Monday of frequency period
LTUES: Last Tuesday of frequency period
LWEDNES: Last Wednesday of frequency period
LTHURS: Last Thursday of frequency period
LFRI: Last Friday of frequency period
LSAT: Last Saturday of frequency period
LD_NO_SUN: Last day of frequency period except that if the last day would be a Sunday, LD_NO_SUN is instead set to Last Saturday of frequency period Table 1—List of Values for start range and end range primitives A start date for the date range, by default, is determined based on the frequency in light of the particular start range value, as described in the above list. In some embodiments, the may be modified by a day modifier ("*_STAR- T_RANGE_DAY_MOD"). The day modifier for a start range is an integer value, positive or negative, representing a number of days after the start range (e.g., for positive values) or a number of days before the start range (e.g., for negative values). The start range day modifier may be used to adjust the start range by a number of days before or after the start date, as otherwise determined. For example, the next start date for a frequency=Q (quarterly, e.g., with beginning of $2^{nd}$ quarter coming up, which starts April $1^{st}$), start range=FD (first day of frequency period), and start range day modifier of "−2" (2 days before the beginning of the frequency period) is March $30^{th}$. In some embodiments, the range primitives (e.g., from Table 1) may include "first working day of month" or "last working day of month" primitives.

The end range ("*_END_RANGE") primitive defines the end of the date range in the frequency period. The end range can be any one of the values listed in Table 1. In the example embodiment, the end date for the date range is the last day of the frequency period. In other words, if no *_END_RANGE is configured, then the *_END_RANGE defaults to "LD", the last day of the frequency period. In other embodiments, the end date for the date range is the start date. In other words, if no *_END_RANGE is configured, then the start date and the end date are the same, defining a range of one day. In some embodiments, the end range may be modified by a day modifier ("*_END_RANGE_DAY_MOD"). The day modifier for an end range is an integer value (e.g., positive, negative, zero) representing a number of days after the end range (e.g., for positive values) or a number of days before the end range (e.g., for negative values). The end range day modifier may be used to adjust the end range by a number of days before or after the end date, as otherwise determined. Continuing the above range example, presume the *_END_RANGE is "FWKD" (first weekday of the frequency period, and presuming April 1 is a Sunday) and the *_END_RANGE_DAY_ MOD is not defined (e.g., defaulting to no modification of the end range). As such, the end range evaluates to April $2^{nd}$ (a Monday, the first weekday after April 1). Accordingly, the example date range is March $30^{th}$ through April $2^{nd}$.

In some embodiments, the gatekeeper 116 is configured to allow for the definition of multiple schedules for a particular job (e.g., multiple schedules defined within the secondary scheduling definition 206). For example, the above job #4321 may need to be executed on the last four days of each month (e.g., as described above), but may also need to be executed on the second Saturday of the month. Within the secondary scheduling definition 206, two schedules are defined for this job. The gatekeeper 116, in this example embodiment, provides a "SCH_1_*" prefix to identify configuration parameters for the first schedule and a "SCH_2_*" prefix to identify configuration parameters for the second schedule. For example, the first schedule (covering the last four days of the month) may be defined as:
SCH_1_FREQUENCY: M (e.g., monthly)
SCH_1_START_RANGE: LD (e.g., last day of month)
SCH_1_START_RANGE_DAY_MOD: −3 (e.g., LD minus 3)
SCH_1_END_RANGE: LD (e.g., last day of month)
SCH_1_END_RANGE_DAY_MOD: 0 (e.g., LD+0).
This first schedule (SCH_1) will be satisfied on the last four days of the month, as described above. A second schedule (covering the second Saturday of the month) may be defined as:

SCH_2_FREQUENCY: M (e.g., monthly)
SCH_2_START_RANGE: FSUN (e.g., first Sunday of month)
SCH_2_START_RANGE_DAY_MOD: +7 (e.g., FSUN+7 days)
SCH_2_END_RANGE: FSUN (e.g., first Sunday of month)
SCH_2_END_RANGE_DAY_MOD: +7 (e.g., FSUN+7 days).
Accordingly, this second schedule (SCH_2) defines a range of one day beginning and ending on the second Sunday of the month (e.g., 7 days after the first Sunday of the month). In some embodiments, additional schedules may be provided.

In conventional job schedulers, to accommodate multiple schedules as in the above example, the administrator 150 would have to define multiple jobs for the same target program 142, with each separate job being defined with one of the schedules. This separate of job definitions for the same underlying target program 142 can present administrative burdens and can lead to errors in execution. For example, if the target program 142 is moved (e.g., from one execution server 140 to another), the administrator 150 may make the necessary changes to one of the jobs for that target program 142 but may forget that there is another job using the same target program 142. As such, the unchanged job will fail during execution as the job scheduler attempts to execute the target program 142 on the wrong execution server 140. Here, the inclusion of multiple schedules within the same job definition (e.g., the secondary scheduling definition 206) allows for a single configuration that supports multiple schedules, and those schedules are not necessarily contiguous, or even of the same frequency type. In some embodiments, the gatekeeper 116 may provide for any number of schedules within a single secondary scheduling definition 206. During processing, if any one of the defined schedules within the secondary scheduling definition 206 is satisfied during the evaluation 226, then the positive result is returned at step 228. In some embodiments, the gatekeeper 116 may process the schedules in sequence and when a schedule is found to be satisfied, then the gatekeeper 116 may discontinue processing of the other schedules and return the negative result at step 228.

In some embodiments, the gatekeeper 116 is implemented as a script (e.g., Python, Perl, or other scripting or interpreted language supported by the job scheduling server 102) or an executable residing on the job scheduling server 102. In some embodiments, schedule parameters may be passed to the gatekeeper 116 during execution (e.g., as execution parameters). In some embodiments, the secondary scheduling definition 206 may be defined and stored in a directory local to the target program 142 and, as such, may be retrieved or otherwise read by the gatekeeper 116 (e.g., from the defined execution server 140) during the process 200 (e.g., when evaluating 226 the secondary scheduling definition). The name of the secondary scheduling definition 206 file may be similar to the target program, but with a pre-defined filename extension (e.g., ".SSD", for "secondary scheduling definition"). For example, if the target program is called "Monthly Processing.exe", then the gatekeeper 116 may look for a file called "Monthly Processing.ssd" in the directory of the target program. If no such file is found, then the secondary scheduling may terminate (e.g., return a result of "no enhanced scheduling definition found", and the primary job scheduler 114 may determine whether or not to continue with execution of the target program 142, fail the current activation with an error, or otherwise.

In some embodiments, during the processing of a schedule, if no valid "*FREQUENCY" is present within the schedule, that schedule may be ignored (e.g., skipping the schedule but continue processing of other schedules) or flagged as a configuration error (e.g., via an error return code to the primary job scheduler 114) without further processing of other schedules. Otherwise, the gatekeeper 116 determines the start and end dates for that frequency (e.g., if weekly, then determine the date of the Sunday and the Saturday of the current week; if monthly, then determine the date of the first day and last day of the current month; if quarterly, then determine the date of the first day of the first month of the quarter and the last day of the third month of the quarter).

In some embodiments, the gatekeeper 116 evaluates "START_RANGE*" parameters. In some embodiments, the gatekeeper 116 may generate an error result if either of the "*_START_RANGE_DAY_MOD" or "*_END_RANGE_DAY_MOD" values exceed a predefined range. For example, the day mod values may be limited to between −6 and +6 for weekly ranges, between −30 and +30 for monthly ranges, and between −91 and +91 for quarterly ranges. In the example embodiment, no such day mod restrictions are enforced. In some embodiments, if the "*_START_RANGE" parameter is unpopulated, then a default value of "FD" (e.g., first day of frequency period) is used. If the "*_START_RANGE" parameter is populated but does not match one of the valid values (e.g., as shown above in Table 1), then an error result is generated. Otherwise, the gatekeeper 116 determines a date of the start of the range (e.g., a start date for the range, or "start range") based on the defined frequency and the value provided by "*_START_RANGE", and then adjusted by the number of days provided by any valid "*_START_RANGE_DAY_MOD", if present. In some embodiments, if the start range date falls before or after the frequency period for the current date, then the start range date may be changed to be the first day (e.g., if falling before) or last day (e.g., if falling after) of the frequency period. If the "*_END_RANGE" is empty, a default of "LD" (last day of the frequency period) is used. Otherwise, an end range date is determined (e.g., using the same logic as with the start range date). In some embodiments, the gatekeeper 116 may return an error result if the end range date is determined to be before the start range date. Otherwise, in some embodiments, a positive result is generated by the schedule if the current date (or the examined date) falls within the start range date and the end range date, inclusive.

In some embodiments, the enhanced scheduling primitives 212 may include other scheduling primitives commonly known in the art. In some embodiments, some or all of the scheduling primitives provided by in the primary scheduling primitives 210 may be provided in the enhanced scheduling primitives. One benefit of the present disclosure is provided by at least some enhanced scheduling primitives 212 not being provided by the primary scheduling primitives 210 of the primary job scheduler 114.

As described herein, the primary scheduling definition 204 defines a set of activation days (e.g., the days on which job #4321 will activate and be processed in the primary job scheduler 114) and the secondary scheduling definition 206 defines a set of execution days (e.g., the days on which the target program 208 will be executed by the primary job scheduler 114). Typically, the administrator 150 may configure the primary scheduling definition 204 for a particular job (e.g., job #4321) to include all of the days that are covered by the secondary scheduling definition 206 for that job, and perhaps other days as well. In such situations, the primary scheduling definition 204 will activate the job on too many days (e.g., some days with execution, some days without) and the secondary scheduling definition 206 provides the indication of whether the target program 208 will execute. In other words, the set of execution days is a subset of the set of activation days.

In other situations, the combination of the primary scheduling definition 204 and the secondary scheduling definition 206 may be configured in such a way as to yield an execution schedule not possible with either the primary scheduling primitives 210 or the enhanced scheduling primitives 212 alone. For example, the primary scheduling definition 204 may exclude some of the days defined by the secondary scheduling definition 206. In other words, the set of execution days identified by the secondary scheduling definition 206 may not be a complete subset of the set of activation days identified by the primary scheduling definition 204.

In some embodiments, the gatekeeper 116 may be configured to initiate the execution of the target program 208 (e.g., in lieu of the primary job scheduler 114). For example, upon determination of a positive result, the gatekeeper 116 may identify and execute, or submit for execution, the target program 208 (e.g., on the target server 440) (e.g., similar to steps 230, 232, and 234). In such embodiments, the primary job scheduler 114 defers to the gatekeeper 116 both the determination of when to execute the job as well as the task of executing that job. In some embodiments, the primary job scheduler 114 may transmit a parameter identifying the target program 208 (and execution server 140) to the gatekeeper 116. In other embodiments, the gatekeeper 116 may be configured to read the primary job definition 202 to determine the identity of the target program 208 (and execution server 140).

In some embodiments, the evaluation date may be determined based on a current date and time from the job scheduling server 102 (e.g., system date/time at the time of activation of the job, or at a job restart time). In other embodiments, the evaluation date may be user-specified. For example, an activation of the job #4321 may begin late in one day and spill over into the next (e.g., in the case of a restart of the job). However, the administrator 150 may still want the job activation to be evaluated using the date of the previous day. As such, the primary job scheduler 114 or the gatekeeper 116 may allow the user (e.g., the administrator 150) to provide the evaluation date that the gatekeeper 116 will use during this activation.

Figure 3:
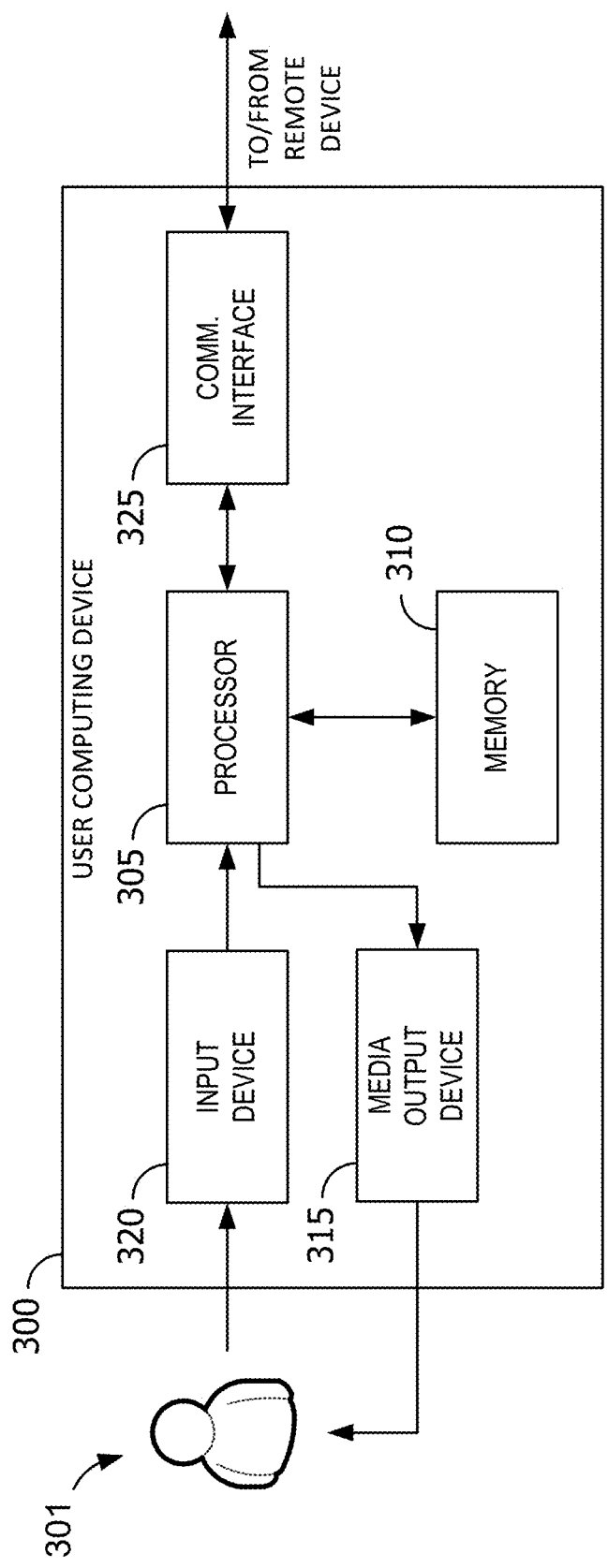

FIG. 3 illustrates an example configuration of a user computing device 300 in accordance with one embodiment of the present disclosure. In some embodiments, the user computing device 300 may be similar to the user computing device 152 shown in FIG. 1. User computer device 300 includes a processor 305 for executing instructions, and a memory area 310. In some embodiments, executable instructions are stored in memory area 310. Processor 305 may, for example, include one or more processing units (e.g., in a multi-core configuration). Memory area 310 may, for example, be any device allowing information such as executable instructions or transaction data to be stored and retrieved. Memory area 310 may further include one or more computer readable media.

In the example embodiment, user computing device 300 further includes at least one media output device 315 for presenting information to user 301 (e.g., such as administrator 150). Media output device 315 may, for example, be any component capable of converting and conveying electronic information to user 301. In some embodiments, media output device 315 includes an output adapter (not shown), such as a video adapter or an audio adapter, which is operatively coupled to processor 305 and operatively coupleable to an output device (also not shown), such as a display device (e.g., a cathode ray tube (CRT), liquid crystal display (LCD), light emitting diode (LED) display, or "electronic ink" display) or an audio output device (e.g., a speaker or headphones).

In some embodiments, media output device 315 is configured to include and present a graphical user interface (not shown), such as a web browser or a client application, to user 301. The graphical user interface may include, for example, an online store interface for viewing or purchasing items, or a wallet application for managing payment information. In some embodiments, user computing device 300 includes an input device 320 for receiving input from user 301. User 301 may use input device 320, without limitation, to select or enter one or more items to purchase or request to purchase, to access credential information, or to access payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, or an audio input device. A single component such as a touch screen may function as both an output device of media output device 315 and input device 320.

In one embodiment, user computing device 300 further includes a communication interface 325, communicatively coupled to a remote device such as the primary job scheduler 114 shown in FIG. 1. Communication interface 325 may include, for example, a wired or wireless network adapter or a wireless data transceiver for use with a mobile telecommunications network.

In the example embodiment, memory area 310 stores computer readable instructions for providing a user interface to user 301 through media output device 315 and, optionally, for receiving and processing input from input device 320. A user interface may include, among other possibilities, a web browser or a client application. Web browsers enable users, such as user 301, to display and interact with media and other information typically embedded on a web page or a website from primary job scheduler 114. A client application allows user 301 to interact with, for example, primary job scheduler 114. For example, instructions may be stored by a cloud service, and the output of the execution of the instructions sent to the media output device 315.

Processor 305 executes computer-executable instructions for implementing aspects of the disclosure. In some embodiments, the processor 305 is transformed into a special purpose microprocessor by executing computer-executable instructions or by otherwise being programmed.

Figure 4:
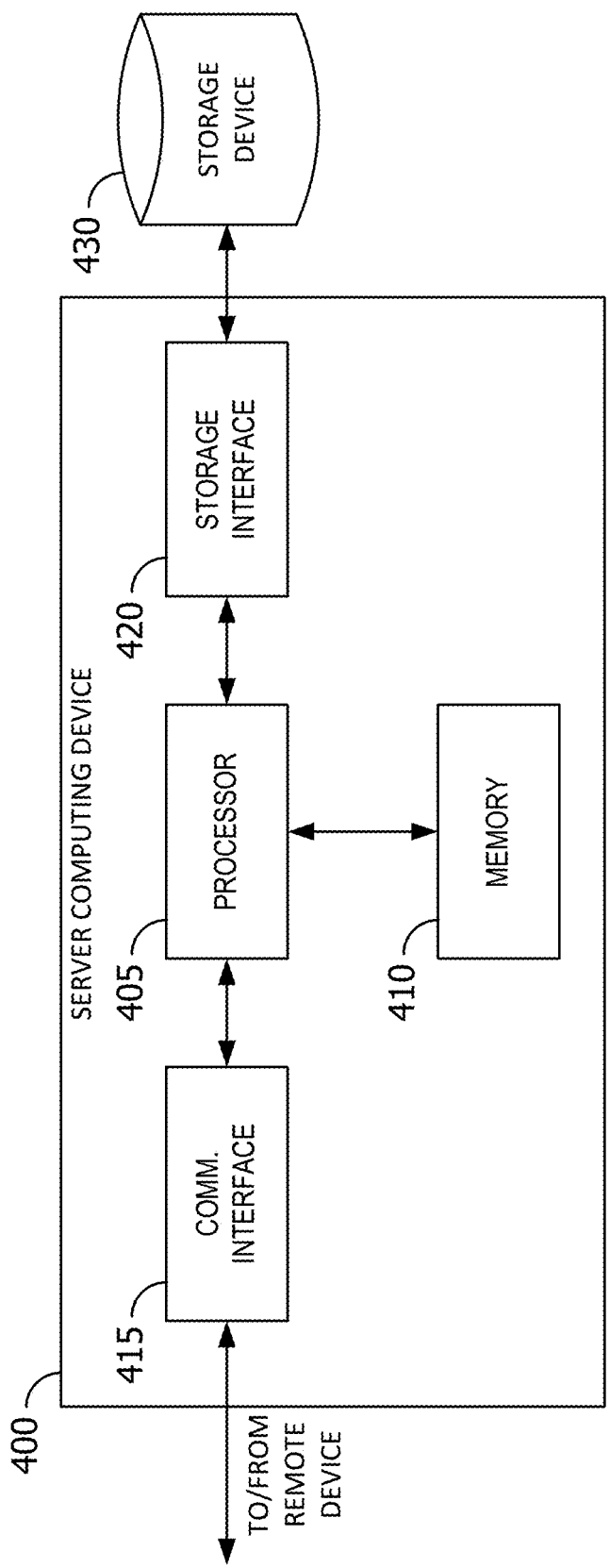

FIG. 4 illustrates an example configuration of a server computing device 400, in accordance with an embodiment of the present disclosure. Server computing device 400 may be representative of the job scheduling server 102 or the execution servers 140 shown in FIG. 1. In the exemplary embodiment, server computing device 400 includes one or more processors 405 for executing instructions (not shown) stored in a memory 410. In an embodiment, processor 405 may include one or more processing units (e.g., in a multi-core configuration). The instructions may be executed within various different operating systems, such as UNIX®, LINUX® (LINUX is a registered trademark of Linus Torvalds), Microsoft Windows®, etc. It should also be appreciated that upon initiation of a computer-based method, various instructions may be executed during initialization. Some operations may be required in order to perform one or more processes described herein, while other operations may be more general or specific to a particular programming language (e.g., C, C#, C++, Java, or other suitable programming languages, etc.).

In the example embodiment, processor 405 is operatively coupled to a communication interface 415 such that server computing device 400 is capable of communicating with a remote device such as a user system or another device 300, 400. For example, communication interface 415 may receive requests from user computing device 300 via the Internet, within the scope of the embodiment illustrated in FIG. 4.

In the example embodiment, processor 405 is also operatively coupled to a storage device 430, which may be, for example, a computer-operated hardware unit suitable for storing or retrieving data. In some embodiments, storage device 430 is integrated in device 400. For example, device 400 may include one or more hard disk drives as storage device 430. In other embodiments, storage device 430 is external to device 400 and may be accessed by a plurality of systems 400. For example, storage device 430 may include multiple storage units such as hard disks or solid state disks in a redundant array of inexpensive disks (RAID) configuration. Storage device 430 may include a storage area network (SAN) or a network attached storage (NAS) system.

In some embodiments, processor 405 is operatively coupled to storage device 430 via an optional storage interface 420. Storage interface 420 may include, for example, a component capable of providing processor 405 with access to storage device 430. In an exemplary embodiment, storage interface 420 further includes one or more of an Advanced Technology Attachment (ATA) adapter, a Serial ATA (SATA) adapter, a Small Computer System Interface (SCSI) adapter, a RAID controller, a SAN adapter, a network adapter, or a similarly capable component providing processor 405 with access to storage device 430.

Memory area 410 may include, but is not limited to, random-access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), and magneto-resistive random-access memory (MRAM). The above memory types are for example only, and are thus not limiting as to the types of memory usable for storage of a computer program.

Figure 5A:
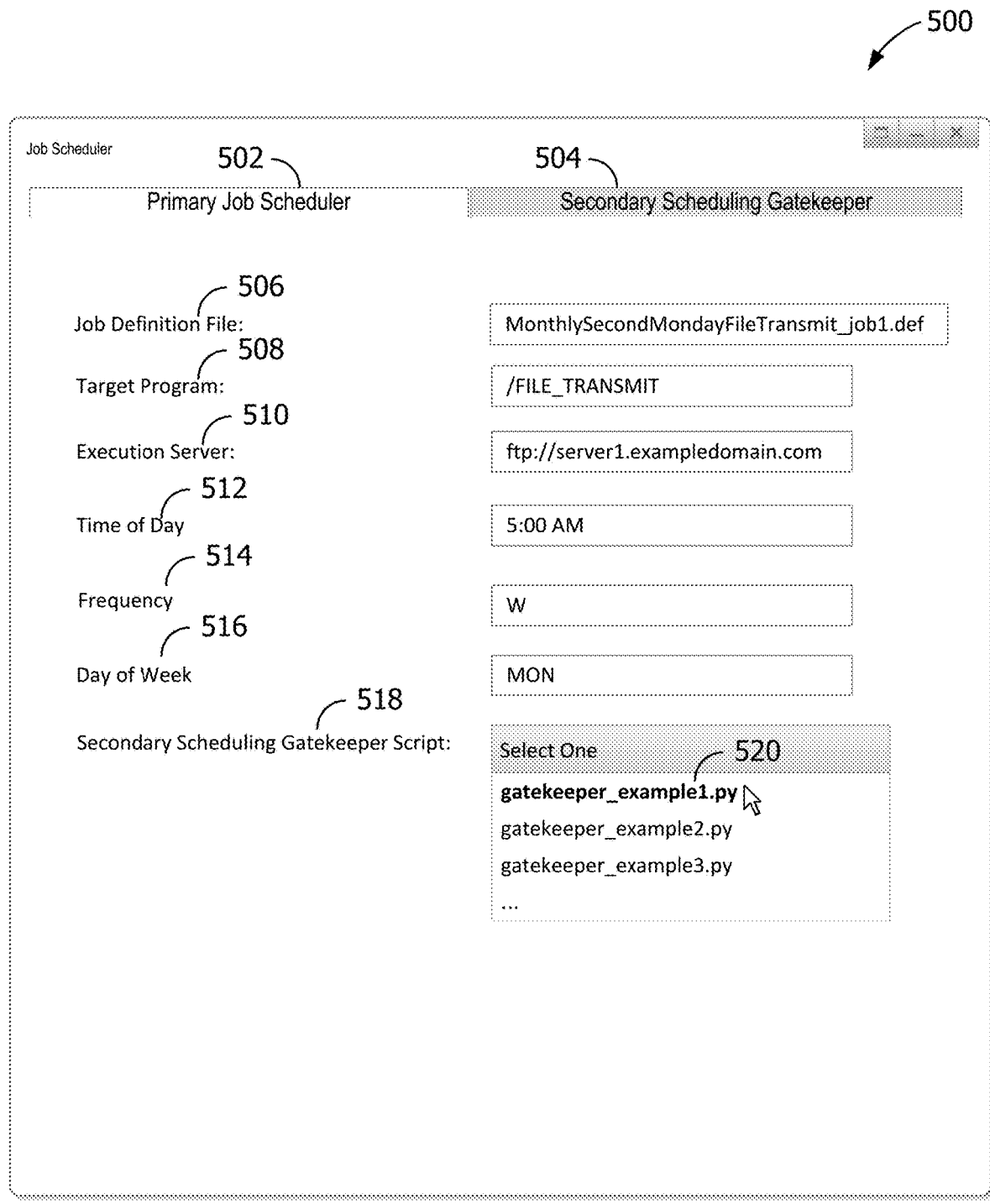
FIG. 5A illustrates an example graphical user interface (GUI) for configuring an example job using a secondary scheduling gatekeeper in conjunction with a primary job scheduler.
Figure 5B:
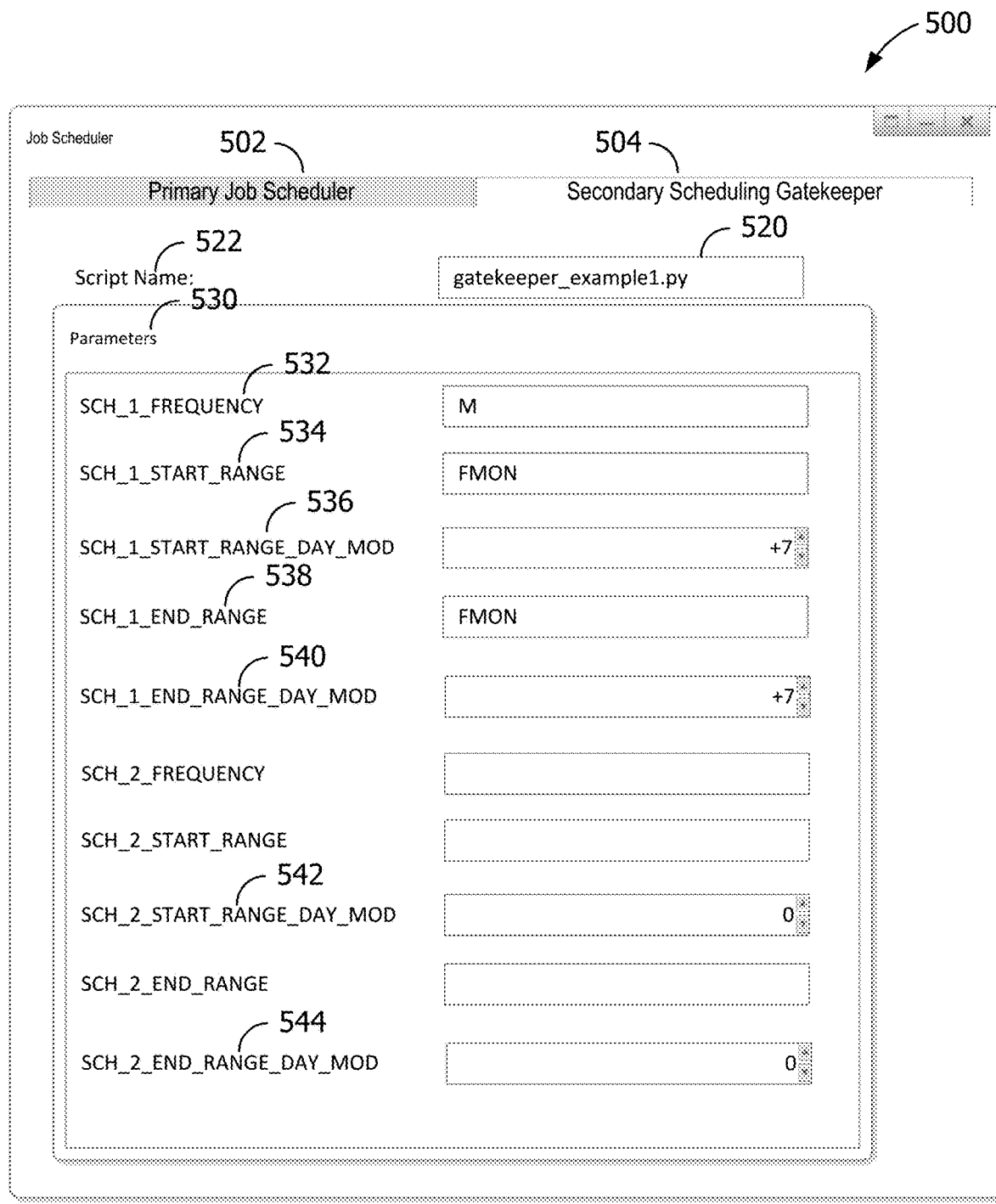
FIG. 5B further illustrates the GUI shown in FIG. 5A.

FIGS. 5A and 5B illustrate an example graphical user interface (GUI) 500 for defining an example job using a secondary scheduling gatekeeper in conjunction with a primary job scheduler. FIG. 5A illustrates one view of GUI 500 an administrator 150 (as shown in FIG. 1) uses to define the example job by configuring a set of primary scheduling primitives 210 (as shown in FIG. 2) and additionally enabling enhanced scheduling. FIG. 5B illustrates another view of GUI 500 administrator 150 uses to further define the example job's enhanced scheduling by configuring a set of enhanced scheduling primitives 212 (as shown in FIG. 2).

Referring now to FIG. 5A, using GUI 500, administrator 150 has configured primary scheduling definition 204 (as shown in FIG. 2) for the example job by configuring a set of primary scheduling primitives under a Primary Job Scheduler tab 502. Time of Day 512 has been configured to be "5:00 AM". Frequency has been configured to be "W" (i.e., weekly). Day of Week has been configured to be "MON" (i.e., Monday). Accordingly, the example job has been configured to run every Monday at 5:00 AM.

In addition, using GUI 500, administrator 150 has configured other job definition parameters. Job Definition File 506 has been configured to be "MonthlySecondMondayFileTransmit_job.def". Target Program 508 has been configured to be "/FILE_TRANSMIT". Execution Server 510 has been configured to be "ftp://server1.exampledomain.com". Further, administrator 150 is enabling enhanced scheduling by selecting a secondary scheduling gatekeeper script 518 named "gatekeeper_example.py" 520 (a script in Python). The job definition parameters shown are for purposes of illustration, and alternatively any suitable parameters may be selected.

Referring now to FIG. 5B, using GUI 500, administrator 150 has configured secondary scheduling definition 206 (as shown in FIG. 2) for the example job by configuring a set of enhanced scheduling primitives under a Secondary Scheduling Gatekeeper tab 504. More specifically, Secondary Scheduler Gatekeeper tab 504 displays a set of configurable enhanced scheduling primitives 212 dynamically based on gatekeeper_example.py 520, which is displayed in GUI field Script Name 522 for context. In other words, gatekeeper_example.py defines the set of enhanced scheduling primitives 212 that are configurable and Secondary Scheduler Gatekeeper tab 504 displays them as input fields in GUI 500.

More specifically, under a Parameters 530 area of Secondary Scheduler Gatekeeper tab 504, administrator 150 has configured the set of enhanced scheduling primitives 212. In the example, SCH_1_FREQUENCY 532 has been configured to be "M" (i.e., monthly). SCH_1_START_RANGE has been configured to be "FMON" (i.e., first Monday of the frequency period). SCH_1_START_RANGE_DAY_MOD has been configured to be +7. SCH_1_END_RANGE has also been configured to be "FMON". SCH_1_END_RANGE_DAY_MOD has also been configured to be +7. However, none of the enhanced scheduling primitives for the second schedule (i.e., the "SCH2_*" primitives) have been configured. SCH_2_START_RANGE_DAY_MOD 542 and SCH_2_END_RANGE_DAY_MOD 544 display a value of "0" because of "0" is the default value for primitives of numerical data type. In effect, the set of enhanced schedule primitives 212 under Secondary Scheduler Gatekeeper tab 504 has modified the example job's schedule (namely, 5:00 AM every Monday) to 5:00 AM every second Monday of the month. The job definition parameters shown are for purposes of illustration, and alternatively any suitable parameters may be selected.

Example embodiments of systems and methods for job scheduling are described above in detail. Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

For example, the methods may also be used in combination with other systems and methods, and are not limited to practice with only the transaction card account systems and methods as described herein. Rather, the example embodiment can be implemented and utilized in connection with many other data storage and analysis applications. While the disclosure has been described in terms of various specific embodiments, those skilled in the art will recognize that particular elements of one drawing in the disclosure can be practiced with elements of other drawings herein, or with modification thereto, and without departing from the spirit or scope of the claims.

As will be appreciated based on the foregoing specification, the above-described embodiments of the disclosure may be implemented using computer programming or engineering techniques including computer software, firmware, hardware or any combination or subset thereof, wherein the technical effect is a flexible system for various aspects of fraud analysis of payment card transactions. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), or any transmitting/receiving medium such as the Internet or other communication network or link. The article of manufacture containing the computer code may be made or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural or object-oriented programming language, or in assembly/machine language. As used herein, the terms "machine-readable medium" and "computer-readable medium" refer to any computer program product, apparatus or device (e.g., magnetic discs, optical disks, memory, Programmable Logic Devices (PLDs)) used to provide machine instructions or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions or data to a programmable processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A job scheduling system for providing enhanced job scheduling with a primary job scheduler, the job scheduling system comprising:
    a processor;
    a memory coupled to the processor;
    a primary job scheduler; and
    a secondary scheduling gatekeeper,
    the primary job scheduler is stored in the memory and executed by the processor to:
        identify a primary job definition for a first job, the primary job definition includes a primary scheduling definition for the first job and identification of a target program;

provide a set of primary scheduling primitives, the set of primary scheduling primitives are used to configure when jobs activate within the primary job scheduler;

activate the first job on an activation date determined based on the primary scheduling definition of the first job, the primary scheduling definition is configured using the set of primary scheduling primitives; and execute the secondary scheduling gatekeeper to evaluate whether the target program associated with the first job is executed during the activation; and the secondary scheduling gatekeeper is stored in the memory and executed by the processor to:

provide a set of enhanced scheduling primitives, the set of enhanced scheduling primitives include one or more scheduling primitives different from the set of primary scheduling primitives;

evaluate a secondary scheduling definition of the first job to determine whether the first job should continue to execution, the secondary scheduling definition is configured using one or more of the scheduling primitives of the set of enhanced scheduling primitives; and return an enhanced scheduling result to the primary job scheduler; and the primary job scheduler is further executed by the processor to:

execute the target program based on the enhanced scheduling result.

2. The system of claim 1, wherein the secondary scheduling gatekeeper is further executed by the processor to determine an evaluation date to use for the first job, wherein evaluating a secondary scheduling definition of the first job to determine whether the first job should continue to execution includes evaluating the secondary scheduling definition using the evaluation date.

3. The system of claim 2, wherein the evaluation date is determined based on a system clock of a system server executing one of the primary job scheduler and the secondary scheduling gatekeeper.

4. The system of claim 2, wherein the evaluation date is a user-provided date.

5. The system of claim 2, wherein the set of enhanced scheduling primitives includes a frequency scheduling primitive including one or more of weekly, monthly, and quarterly, wherein the secondary scheduling gatekeeper is further executed by the processor to determine a current frequency window for the first job based on the evaluation date, the current frequency window defining a beginning date of the current frequency window and an ending date of the current frequency window.

6. The system of claim 5, wherein the set of enhanced scheduling primitives includes one or more scheduling primitives that is used to define a date range based on the current frequency window.

7. A computer-implemented method for job scheduling and execution, the method implemented using a processor in communication with a memory, the method comprising:

identifying, by a primary job scheduler, a primary job definition for a first job, the primary job definition includes a primary scheduling definition for the first job and identification of a target program;

activating, by the primary job scheduler, the first job on an activation date determined based on the primary scheduling definition of the first job, the primary scheduling definition is configured using a set of primary scheduling primitives provided by the primary job scheduler;

executing, by the primary job scheduler, a secondary scheduling gatekeeper to evaluate whether the target program associated with the first job is executed during the activation;

evaluating, by the secondary scheduling gatekeeper, a secondary scheduling definition of the first job to determine whether the first job should continue to execution, the secondary scheduling definition is configured using one or more of scheduling primitives of a set of enhanced scheduling primitives provided by the secondary scheduling gatekeeper, the set of enhanced scheduling primitives includes one or more scheduling primitives not includes in the set of primary scheduling primitives;

return, by the secondary scheduling gatekeeper, an enhanced scheduling result to the primary job scheduler; and execute, by the primary job scheduler, the target program based on the enhanced scheduling result.

8. The method of claim 7, further comprising determining, by the secondary scheduling gatekeeper, an evaluation date to use for the first job, wherein evaluating a secondary scheduling definition of the first job to determine whether the first job should continue to execution includes evaluating the secondary scheduling definition using the evaluation date.

9. The method of claim 8, wherein the evaluation date is determined based on a system clock of a system server executing one of the primary job scheduler and the secondary scheduling gatekeeper.

10. The method of claim 8, wherein the evaluation date is a user-provided date.

11. The method of claim 8, wherein the set of enhanced scheduling primitives includes a frequency scheduling primitive including one or more of weekly, monthly, and quarterly, the method further comprising determining a current frequency window for the first job based on the evaluation date, the current frequency window defining a beginning date of the current frequency window and an ending date of the current frequency window.

12. The method of claim 11, wherein the set of enhanced scheduling primitives includes one or more scheduling primitives that is used to define a date range based on the current frequency window.

13. A non-transitory computer readable medium that includes computer instructions wherein, when executed by a computing device comprising at least one processor in communication with at least one memory device, the computer instructions cause the computing device to:

identify, by a primary job scheduler, a primary job definition for a first job, the primary job definition includes a primary scheduling definition for the first job and identification of a target program;

activate, by the primary job scheduler, the first job on an activation date determined based on the primary scheduling definition of the first job, the primary scheduling definition is configured using a set of primary scheduling primitives provided by the primary job scheduler;

execute, by the primary job scheduler, a secondary scheduling gatekeeper to evaluate whether the target program associated with the first job is executed during the activation;

evaluate, by the secondary scheduling gatekeeper, a secondary scheduling definition of the first job to determine whether the first job should continue to execution, the secondary scheduling definition is configured using one or more of scheduling primitives of a set of enhanced scheduling primitives provided by the secondary scheduling gatekeeper, the set of enhanced scheduling primitives includes one or more scheduling primitives not includes in the set of primary scheduling primitives;

return, by the secondary scheduling gatekeeper, an enhanced scheduling result to the primary job scheduler; and execute, by the primary job scheduler, the target program based on the enhanced scheduling result.

14. The non-transitory computer readable medium of claim 13, wherein the computer instructions further cause the computing device to determine, by the secondary scheduling gatekeeper, an evaluation date to use for the first job, wherein evaluating a secondary scheduling definition of the first job to determine whether the first job should continue to execution includes evaluating the secondary scheduling definition using the evaluation date.

15. The non-transitory computer readable medium of claim 14, wherein the evaluation date is determined based on a system clock of a system server executing one of the primary job scheduler and the secondary scheduling gatekeeper.

16. The non-transitory computer readable medium of claim 14, wherein the evaluation date is a user-provided date.

17. The non-transitory computer readable medium of claim 14, wherein the set of enhanced scheduling primitives includes a frequency scheduling primitive including one or more of weekly, monthly, and quarterly, the computer instructions further cause the computing device to determine a current frequency window for the first job based on the evaluation date, the current frequency window defining a beginning date of the current frequency window and an ending date of the current frequency window, wherein the set of enhanced scheduling primitives includes one or more scheduling primitives that is used to define a date range based on the current frequency window.

* * * * *